(12) United States Patent
    Drew

(10) Patent No.: US 8,770,490 B2
(45) Date of Patent: Jul. 8, 2014

(54) PROGRAMMABLE THERMOSTAT

(75) Inventor: David Scott Drew, St. Louis, MO (US)

(73) Assignee: Emerson Electric Co., St. Louis, MO (US)

( * ) Notice: Subject to any disclaimer, the term of this patent is extended or adjusted under 35 U.S.C. 154(b) by 771 days.

(21) Appl. No.: 12/858,594

(22) Filed: Aug. 18, 2010

(65) Prior Publication Data

US 2010/0308120 A1    Dec. 9, 2010

(51) Int. Cl.
*F24F 11/053*     (2006.01)
*G05D 23/12*     (2006.01)
*G01M 1/38*     (2006.01)
*F24F 11/00*     (2006.01)

(52) U.S. Cl.
CPC ................ *F24F 11/0012* (2013.01)
USPC ........................ 236/1 C; 700/278

(58) Field of Classification Search
USPC ............. 236/46 R, 94, 1 C; 700/278
See application file for complete search history.

(56) References Cited

U.S. PATENT DOCUMENTS 4,298,946 A * 11/1981 Hartsell et al. ............. 700/278
4,632,177 A * 12/1986 Beckey ...................... 165/239
5,937,942 A    8/1999 Bias et al. .................. 165/238
7,114,554 B2 * 10/2006 Bergman et al. ........... 165/238
7,299,996 B2   11/2007 Garrett et al. .............. 236/94
2007/0114293 A1   5/2007 Gugenheim ............... 236/49.3

* cited by examiner

*Primary Examiner* — Chen Wen Jiang
(74) *Attorney, Agent, or Firm* — Harness, Dickey & Pierce, P.L.C.

(57) ABSTRACT

A thermostat for a climate control system includes an electronic memory in which at least three occupancy settings are stored. The occupancy settings including a pre-defined unoccupied temperature set-point associated with an unoccupied state, a pre-defined occupied temperature set-point associated with an occupied-awake state and a pre-defined sleep temperature set-point associated with an occupied-asleep state. The thermostat's microprocessor is configured to communicate with the memory, and to establish at least three time periods during the day. The microprocessor assigns to each time period one of at least three user-selectable occupancy states including an unoccupied state, an occupied-awake state and an occupied-asleep state. The microprocessor controls operation of the climate control system to maintain the unoccupied temperature set-point during any time period assigned the unoccupied state, the occupied temperature set-point during any time period assigned the occupied-awake state, and the sleep temperature set-point to any time period assigned the occupied-asleep state.

17 Claims, 8 Drawing Sheets

PROGRAMMABLE THERMOSTAT

FIELD

The present disclosure relates to thermostats for controlling the level of operation of a climate control system to adjust the temperature of a space to maintain a temperature setpoint.

BACKGROUND

This section provides background information related to the present disclosure which is not necessarily prior art.

Many digital programmable thermostats allow for programming time and temperature settings for various days of the week. However, the typical programmable thermostat requires entry of temperature settings for numerous different time periods that the user must select, which entails pressing the necessary series of different buttons to program the thermostat. If the user is faced with a thermostat having a daunting series of different buttons to press and screens to progress through to enter such temperature settings, the user is not likely to realize any energy savings due to the user's apprehension towards programming the thermostat.

SUMMARY

This section provides a general summary of the disclosure, and is not a comprehensive disclosure of its full scope or all of its features.

Various embodiments are disclosed of a thermostat for controlling the operation of a climate control system to adjust the temperature of a space to maintain a select predefined temperature set-point associated with a given time period during the day. One embodiment of a thermostat for a climate control system includes an electronic memory in which at least three occupancy settings are stored. The at least three occupancy settings include a pre-defined unoccupied temperature set-point associated with an unoccupied state, a pre-defined occupied temperature set-point associated with an occupied-awake state and a pre-defined sleep temperature set-point associated with an occupied-asleep state. The thermostat further includes a microprocessor configured to communicate with the electronic memory, and to establish at least three time periods during the day. The microprocessor is configured to assign to each of the time periods one of at least three user-selectable occupancy states including an unoccupied state, an occupied-awake state and an occupied-asleep state. Accordingly, the microprocessor controls operation of the climate control system to maintain the unoccupied temperature set-point during any time period assigned the unoccupied state, and to maintain the occupied temperature set-point during any time period assigned the occupied-awake state, and to maintain the sleep temperature set-point during any time period assigned the occupied-asleep state.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
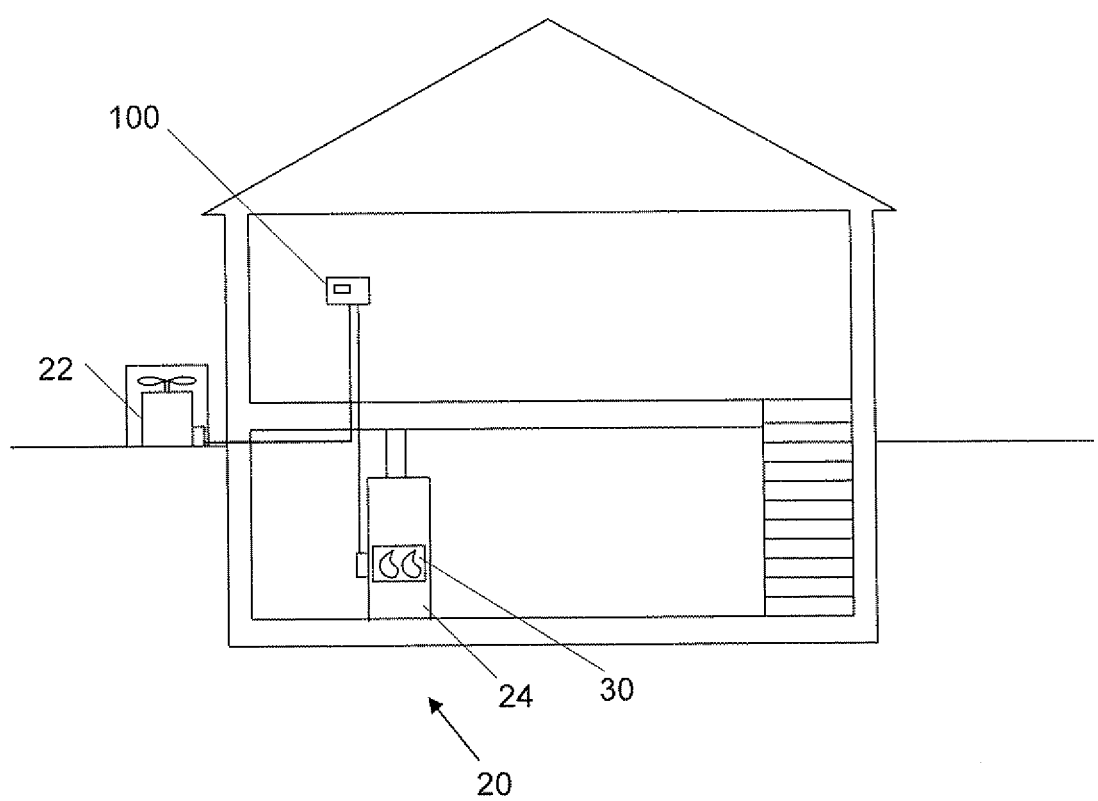
FIG. 1 is an illustration of a building incorporating one embodiment of a thermostat according to the principles of the present disclosure.

In the various embodiments of the present disclosure, a thermostat is provided for controlling an air conditioner or heating system to adjust the temperature of a space to maintain a predefined temperature set-point associated with a user-selected occupancy state. Referring to FIG. 1, a programmable thermostat 100 is provided that is preferably in communication with various components of a climate control system 20. The climate control system 20 may include an air conditioning system having a compressor unit 22 and a blower unit 24, and/or a heating system 30 with a blower unit 24. The thermostat 100 controls the operation of the air conditioning system via connections to a compressor unit 22 and a blower unit 24. The thermostat 100 controls operation of the climate control system 20 as needed to adjust the sensed temperature in the space to maintain a predefined temperature set-point associated with an occupancy state for a given time period of the day. More specifically, the thermostat 100 is programmable to include at least three time periods during the day, and a number of predefined temperature set-points associated with the at least three time periods, as explained below.

Figure 2:
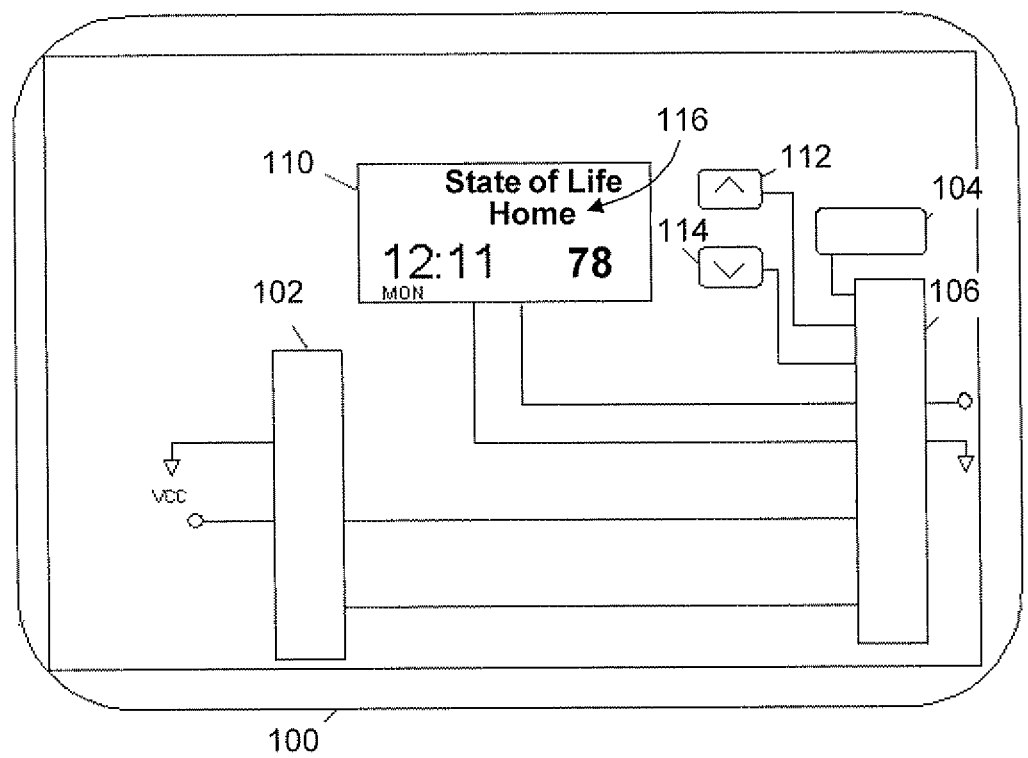
FIG. 2 is a schematic illustration of a first embodiment of a thermostat, in accordance with the present disclosure.

Referring to FIG. 2, a schematic diagram provides an illustration of a first embodiment of the thermostat 100, according to the principles of the present disclosure. The thermostat 100 includes an electronic memory 102, such as an electronically erasable programmable read-only-memory (EEPROM), in which at least three occupancy settings are stored. The at least three occupancy settings include a pre-defined unoccupied temperature set-point associated with an unoccupied state, a pre-defined occupied temperature set-point associated with an occupied-awake state and a pre-defined sleep temperature set-point associated with an occupied-asleep state. These predefined temperature set-points are the only temperature set-points utilized by the thermostat 100 for controlling operation of the climate control system 20 to adjust the temperature in the space.

The thermostat 100 further includes an internal temperature sensor 104, which sensor allows for determining the sensed temperature within the space. The sensor 104 preferably comprises a temperature responsive device that outputs a variable, value or signal that is indicative of the temperature in the space. The sensor 104 may be any of a number of sensor types, and may comprise a crystal, oscillator or other electronic component having a frequency that responsively changes with temperature. Alternatively, the sensor 104 may comprise a thermistor having a resistance value that changes in response to changes in temperature. The sensor 104 could also be a device capable of communicating a voltage value that correlates to, or is indicative of, the temperature sensed in the space. The sensor 104 may include circuitry to permit the sensor to communicate an absolute value of the temperature to a tenth of degree Fahrenheit. Likewise, the sensor 104 may also include circuitry to enable communication of temperature information on a periodic basis, or upon request, such as when prompted by a microprocessor 106 of the thermostat 100. Accordingly, in the various embodiments, the temperature sensor 104 is configured to sense and provide information that is indicative of the sensed temperature in the space.

The thermostat 100 further includes a display device 110 and at least one user input means for permitting user adjustment or selection, for example. The input means preferably comprises one or more buttons 112, 114 for use in adjustment, navigation and/or selection purposes. Alternatively, a display device may include an input means that comprises a touch-sensitive switch membrane (not shown) disposed over the display device 110, which may be associated with an icon displayed on the display device. The user input means permit the user to select an occupancy setting 116 from one of at least three settings (unoccupied, occupied or sleep) for each of the time periods during the day, as explained below.

The thermostat 100 further includes a microprocessor 106 that is in communication with the at least one temperature sensor 104, and obtains the output or signal information from the sensor 104 indicative of the temperature in the space for use in determining a sensed temperature value. The thermostat microprocessor 106 is configured to compare the sensed temperature to a predefined temperature set-point, and to control operation of the climate control system 20 by initiating signals for activating the air conditioning system compressor unit 22 where the space temperature is above a predefined temperature set-point, or initiating signals for activating the heating system 30 where the space temperature is below a predefined temperature set-point.

The microprocessor 106 preferably includes a software program for controlling the thermostat 100 to control operation of a climate control system 20 to maintain a select predefined set-point temperature for a space. Specifically, the microprocessor 106 is programmed or encoded with software instructions that are operable to compare the sensed temperature to a predefined temperature set-point and to initiate signals to activate the climate control system 20 to maintain a set-point temperature, as explained below.

The microprocessor 106 is configured to communicate with the electronic memory 102, and is configured to establish at least three time periods during the day during which different predefined temperature setpoints are maintained. The microprocessor 106 is preferably configured to assign to each of the time periods one of at least three user-selectable occupancy states, including an unoccupied state, an occupied-awake state and an occupied-asleep state. The microprocessor 106 is configured to control operation of the climate control system 20 to maintain a predefined set-point temperature associated with the user-selected occupancy state. Specifically, the microprocessor 106 includes a read-only-memory that is programmed or encoded with instructions operable to designate, for each of three or more time periods during the day, one of at least three user-selectable occupancy states including an unoccupied state, an occupied-awake state and an occupied-asleep state. The microprocessor 106 and the encoded instructions are operable to assign the unoccupied temperature set-point to each time period designated (by a user) as the unoccupied state, the occupied temperature set-point to each time period designated (by a user) as the occupied-awake state, and the sleep temperature set-point to each time period designated (by a user) as the occupied-asleep state. The thermostat 100 does not permit a user to enter a numerical temperature set-point value, but rather only permits selection of a setpoint from the predefined unoccupied temperature set-point, the pre-defined occupied temperature set-point and the pre-defined sleep temperature set-point.

Figure 3:
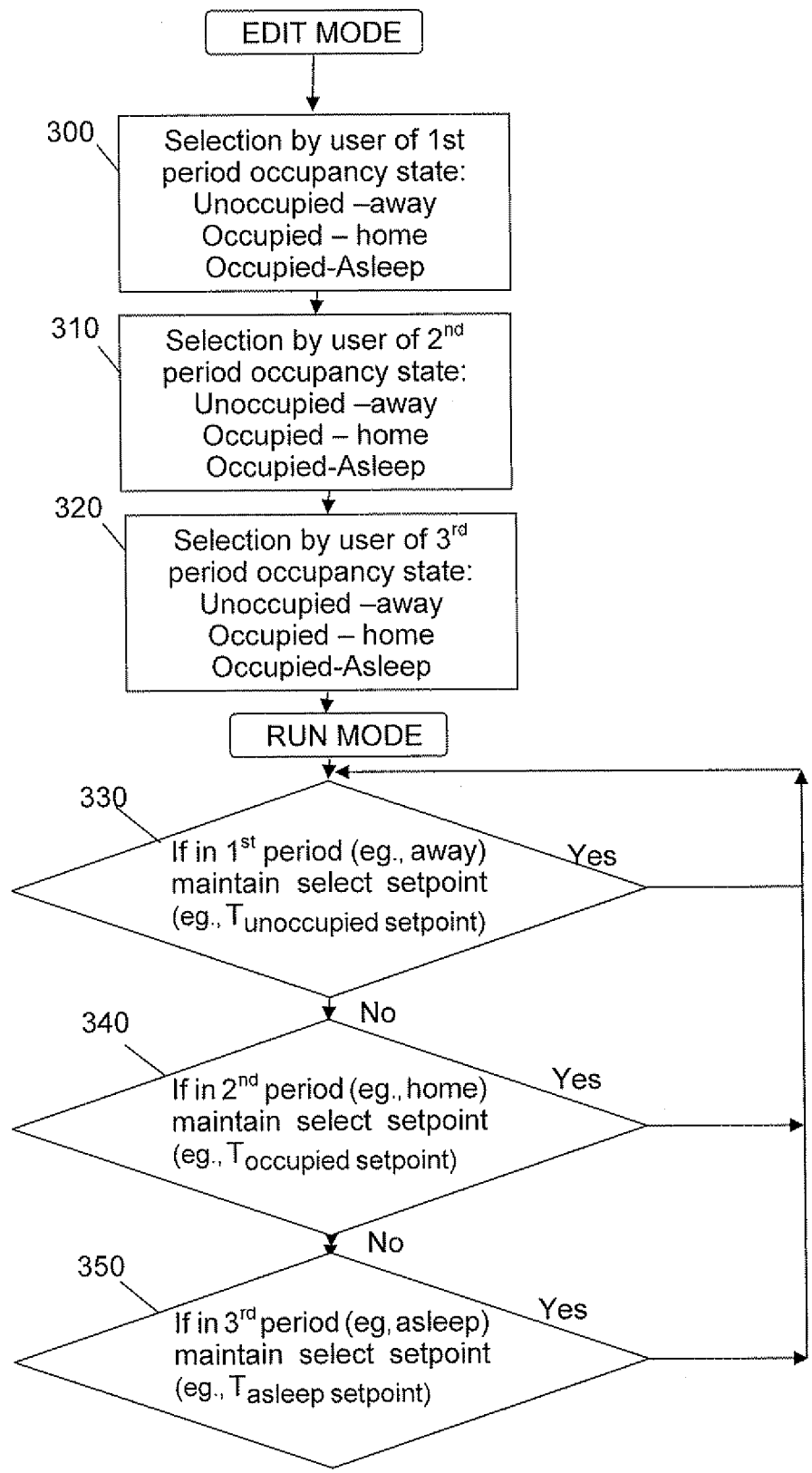
FIG. 3 shows a flow chart illustrating the programming of the thermostat of the first embodiment.

Referring to FIG. 3, a flow chart is shown illustrating the software program and/or instructions of the microprocessor 106 regarding designation of occupancy states and predefined temperature set-points. The microprocessor 106 (or software program) may be operable in both a run mode and an edit mode, as explained. For a first time period during the day, such as 8 AM to 4 PM for example, the microprocessor 106 (or software program) allows a user to select at step 300 a desired occupancy state from an unoccupied state, an occupied-awake state and an occupied-asleep state. The microprocessor 106 (or software program) continues in steps 310 and 320 with the selection of occupancy states for a second time period (4:00 PM to 10:59 PM, for example) and a third time period (11:00 PM to 7:59 AM, for example). In the run mode in steps 330-350, the microprocessor 106 is configured to maintain the unoccupied temperature set-point during any time period assigned the unoccupied state, and to maintain the occupied temperature set-point during any time period assigned the occupied-awake state, and to maintain the sleep temperature set-point during any time period assigned the occupied-asleep state. Accordingly, the microprocessor 106 is configured to control operation of the heating system 30 and/or air conditioner compressor unit 22 during each of the at least three time periods to maintain only one of the pre-defined unoccupied temperature set-point, the pre-defined occupied temperature set-point or the pre-defined sleep temperature set-point. Each of the pre-defined unoccupied temperature set-point, the pre-defined occupied temperature set-point, and the pre-defined sleep temperature set-point are preferably default values that are stored in a memory of the thermostat, which may be stored at the time of manufacture, for example. Additionally, the pre-defined unoccupied temperature set-point value, the pre-defined occupied temperature set-point value, and the pre-defined sleep temperature set-point value may each be adjusted by a user of the thermostat.

Figure 4:
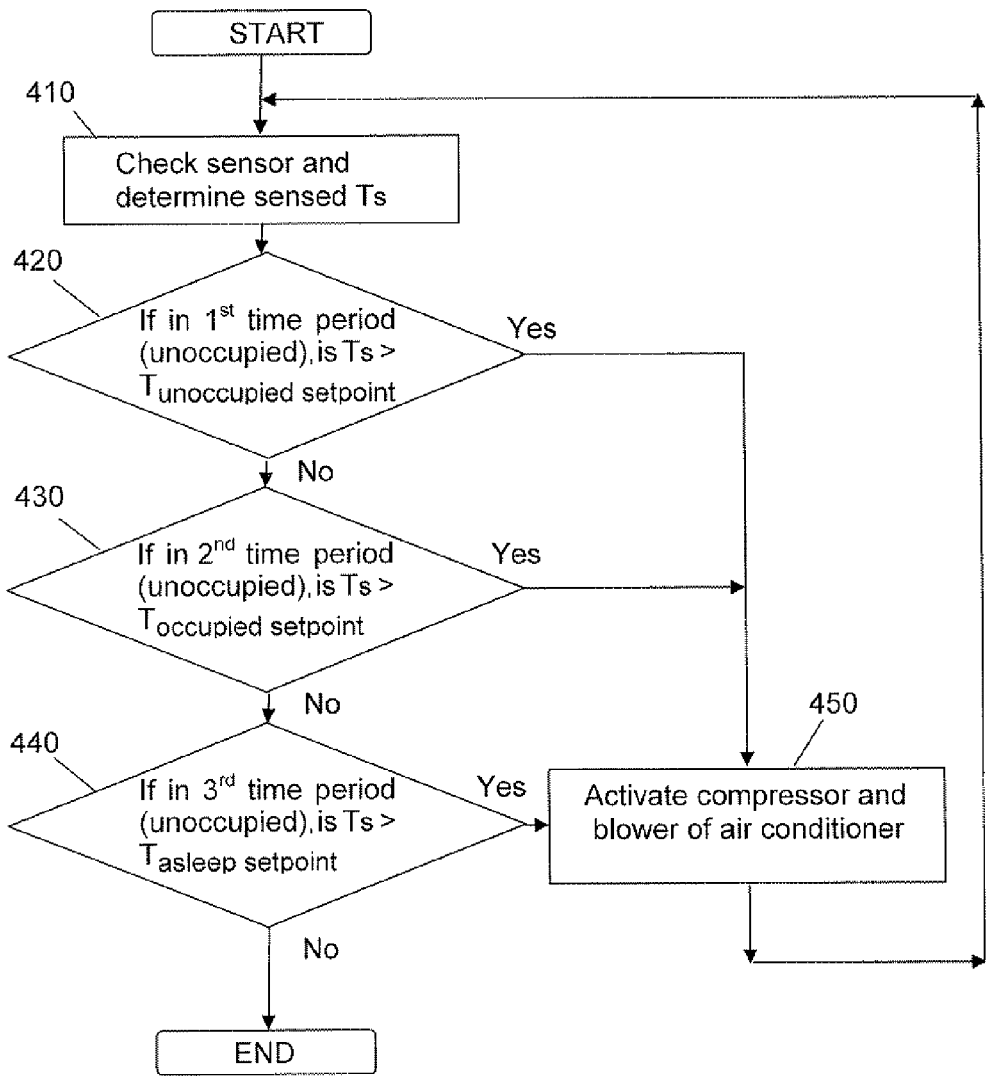
FIG. 4 shows a flow chart illustrating the control of a climate control system by the thermostat of the first embodiment.

Referring to FIG. 4, a flow chart is shown illustrating the control of the microprocessor 106 of the thermostat 100 of the first embodiment, in a cooling mode. At step 410, the microprocessor 106 determines a sensed temperature value from the sensor information that is indicative of the sensed temperature, which is then stored. Where operation is during a first time period that has been assigned an unoccupied state by the user, the microprocessor 106 compares at step 420 the sensed temperature to the predefined unoccupied temperature set-point associated with an unoccupied state (85° F., for example). Where the sensed temperature is below the pre-defined unoccupied temperature set-point, the microprocessor 106 does not initiate operation of the climate control system 20. Where operation is during a second time period that has been assigned an occupied state by the user, the microprocessor 106 compares at step 430 the sensed temperature to the predefined occupied-awake temperature set-point associated with an unoccupied state (78° F., for example). Where the sensed temperature is above the predefined occupied temperature set-point, the microprocessor 106 initiates signals for activating relays to activate the air conditioning system at step 450. Where operation is during a third time period that has been assigned a sleep state by the user, the microprocessor 106 compares at step 440 the sensed temperature to the predefined occupied-asleep temperature set-point associated with the sleep state (76° F., for example). Where the sensed temperature is below the predefined occupied-asleep temperature set-point, the microprocessor 106 would not initiate operation of the climate control system 20.

In the above embodiment, the thermostat 100 is operable in either a cooling or heating mode of operation. For the cooling mode of operation, the thermostat 100 may, for example, have a pre-defined occupied-awake temperature set-point of 78 degrees Fahrenheit. The pre-defined unoccupied temperature set-point and pre-defined asleep temperature set-point are preferably both off-set at least 3 degrees relative to the pre-defined occupied temperature set-point, to provide for reduced cooling operation and energy cost savings. The thermostat 100 may, for example, have a pre-defined unoccupied-away temperature set-point of 85 degrees Fahrenheit, and a pre-defined occupied-asleep temperature set-point of 80 degrees Fahrenheit, which settings would provide for reduced cooling operation and energy costs relative to the 78 degree setpoint. Accordingly, the above thermostat 100 may include a pre-defined occupied temperature set-point of 79 degrees Fahrenheit or less that is associated with an occupied-awake state, a pre-defined unoccupied temperature set-point greater than 80 degrees Fahrenheit that is associated with an unoccupied state, and a pre-defined sleep temperature set-point greater than 79 degrees Fahrenheit that is associated with an occupied-asleep state, whereby the predefined temperature setpoints provide for reduced energy costs.

Figure 5:
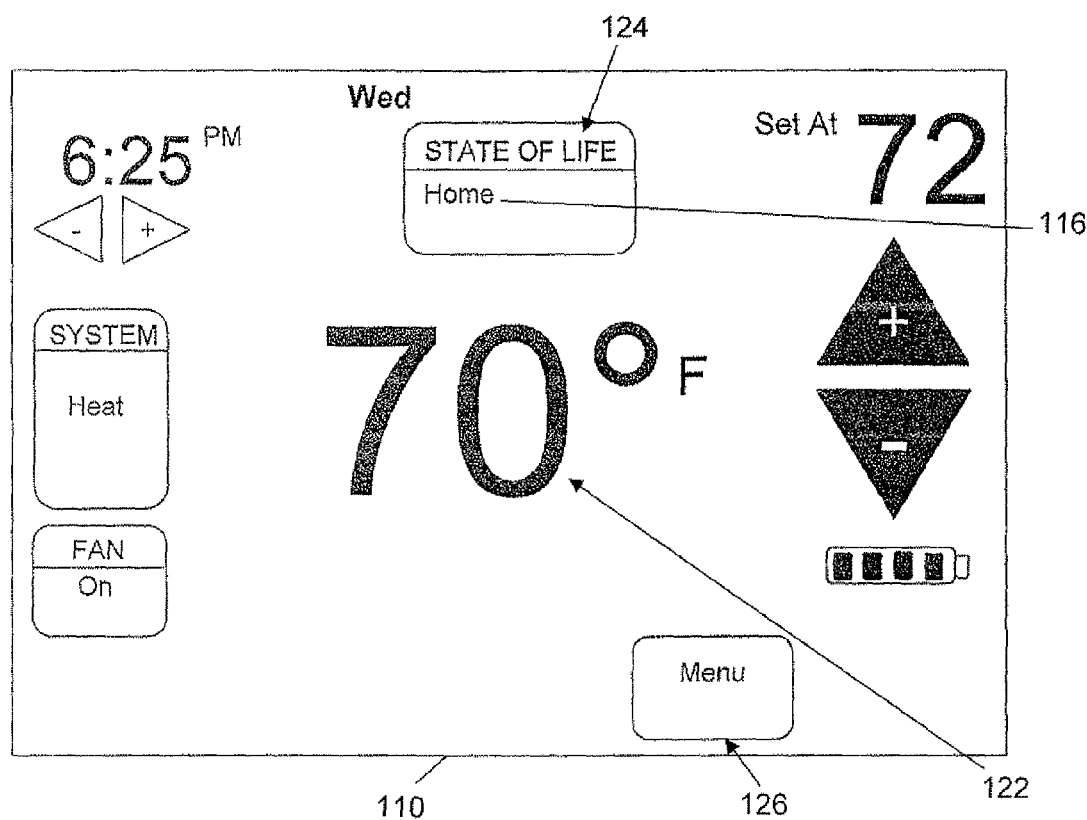
FIG. 5 shows an alternate embodiment of a thermostat including the display with a menu option, according to the principles of the present disclosure.
Figure 6:
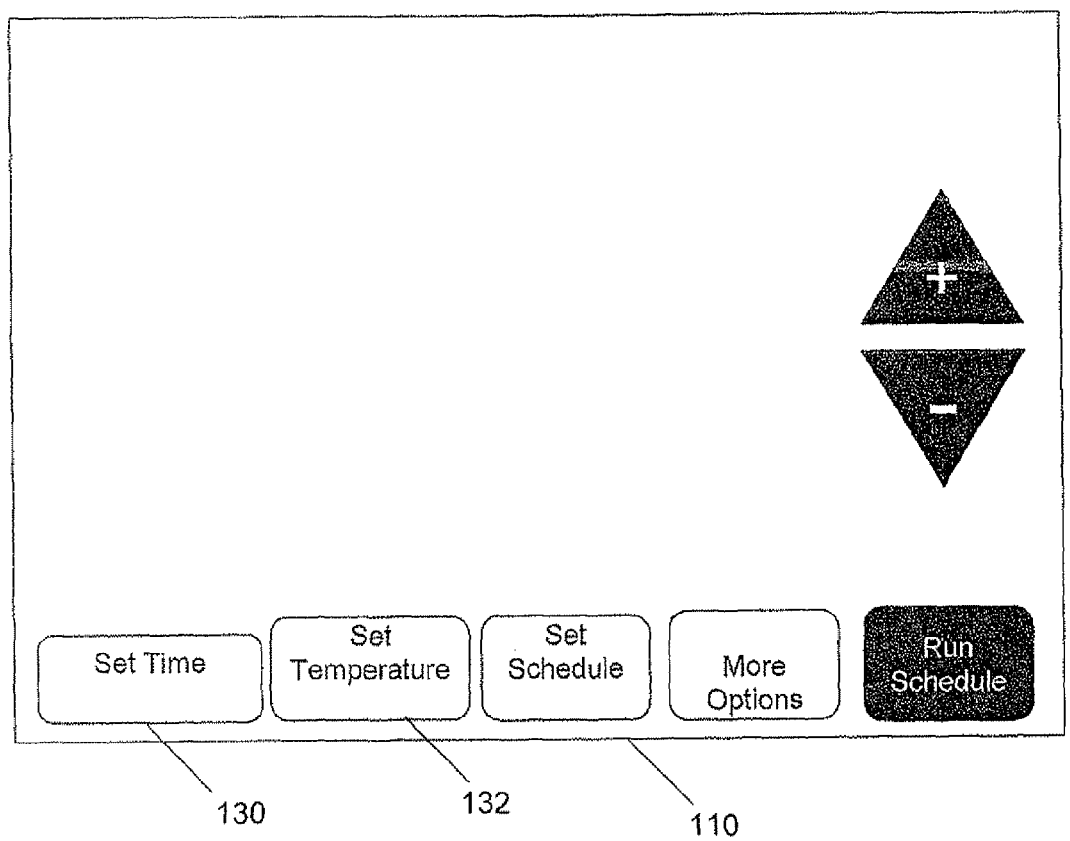
FIG. 6 shows the display in FIG. 5 with a temperature setting option.
Figure 7:
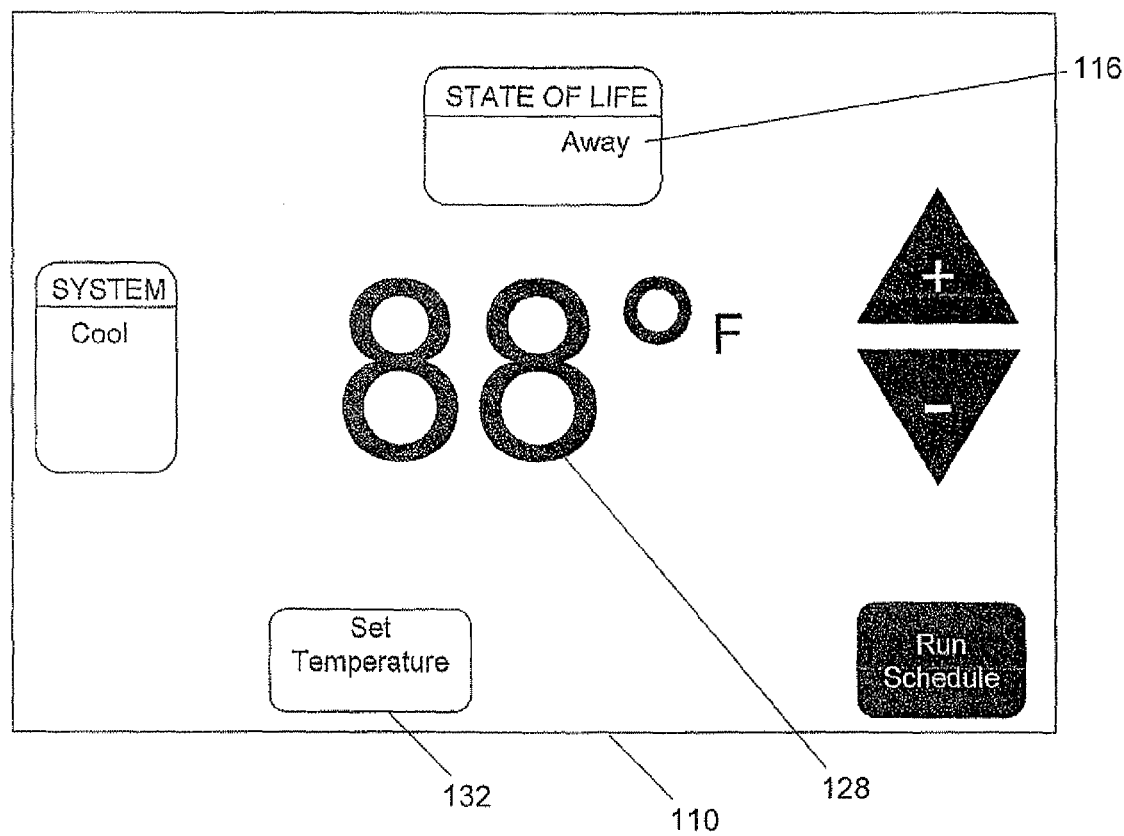
FIG. 7 shows the display in FIG. 5 with a user selectable field.
Figure 8:
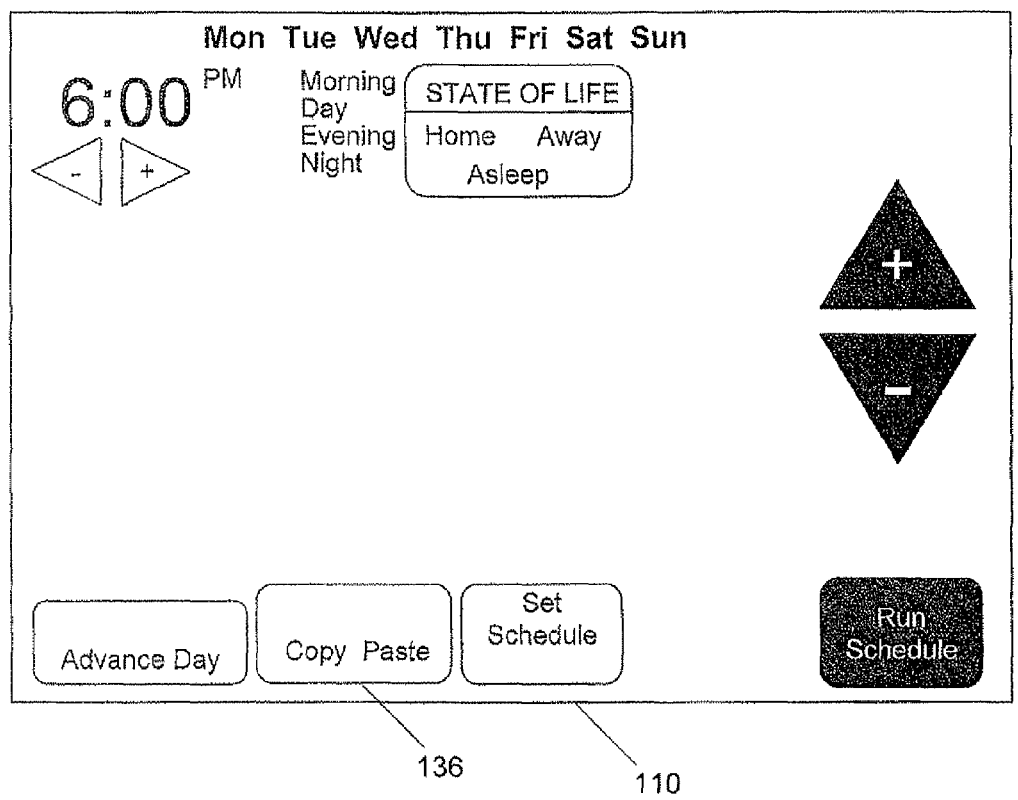
FIG. 8 shows the display of the thermostat in FIG. 5 with a copy settings option.

Referring to FIGS. 5-8, an alternate construction of the thermostat 100 is shown with an enlarged display device 110, such as an LCD display, which may further include a touch-sensitive switch membrane (not shown) on the display that is in communication with the microprocessor 106. As shown in FIG. 5, the display device 110 may be configured to display information such as the current sensed temperature 122 (e.g., 70° F.), a "state of life" or occupancy heading 124, the current "state of life" or occupancy setting 116 (e.g., occupied or home), and a menu option 126. Upon selecting the menu option, the display device 110 displays a set time option 130 and set temperature option 132, as shown in FIG. 6. Upon selecting the set temperature option 132, the display device 110 displays a displayed temperature set-point 128 for a given time period, as in FIG. 7. The displayed temperature set-point 128 shown in FIG. 7 is the unoccupied temperature set-point (e.g., 88° F.) associated with the displayed occupancy setting 116 of "Away". Using the input means, the user can change a user-selectable field for the occupancy setting 116 to "Home" or "Asleep," which will change the displayed temperature set-point 128 to either the occupied-awake temperature set-point or occupied-asleep temperature set-point. Thus, for each time period during the day, the user can simply select a "State Of Life" setting based on whether they are away, home or asleep, and have an associated temperature set-point automatically set for the time period. As shown in FIG. 8, the user can also use a copy option 136 to copy and paste settings from one day to other days of the week.

By displaying a "State Of Life" setting for either "Home," "Away" or "Asleep," the user can simply select a "State Of Life" setting based on whether they are away, home or asleep and have an associated temperature set-point automatically set, to thereby eliminate the need for successively entering temperature set-points. In this manner, the user would be able to more easily program the thermostat, such that the user would be more likely to select temperature set-points during unoccupied or asleep time periods that would result in reduced energy consumption. Accordingly, the thermostat 100 provides a user with a more simplified way to program settings for a thermostat to reduce energy consumption during specific time periods to reduce energy costs.

The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A thermostat for a climate control system, comprising:
   an electronic memory for storing at least three occupancy state set-points including an unoccupied temperature set-point, an occupied temperature set-point, and a sleep temperature set-point; and
   a microprocessor configured to:
   receive a first user input predefining, independently of any time period scheduled or schedulable for thermostat operation, one or more of the at least three occupancy state set-points;
   assign each of the one or more predefined occupancy state set-points to a corresponding one of at least three occupancy states including an unoccupied state, an occupied-awake state, and an occupied-asleep state; and
   receive a second user input assigning one or more of the at least three occupancy states to one or more time periods;
   wherein the microprocessor controls operation of the climate control system to maintain one of the pre-defined occupancy state set-points during any time period assigned the occupancy state corresponding to the one of the predefined occupancy state set-points; and
   wherein one of the occupancy states is selectable by a user for a plurality of time periods during the day.

2. The thermostat of claim 1 wherein the at least three occupancy state set-points comprise heating temperature set-points user-selectable for assignment to the at least three occupancy states for a heating mode, and cooling temperature set-points user-selectable for assignment to the at least three occupancy states for a cooling mode of the climate control system.

3. The thermostat of claim 2, wherein the microprocessor controls operation of the climate control system to maintain only one of the pre-defined unoccupied temperature set-point, the pre-defined occupied temperature set-point or the pre-defined sleep temperature set-point.

4. The thermostat of claim 1, wherein the one or more time periods are adjustable.

5. The thermostat of claim 1, wherein the at least three occupancy states are selectable for each day of the week.

6. The thermostat of claim 1, wherein the pre-defined unoccupied temperature set-point and pre-defined sleep temperature set-point are both off-set at least 3 degrees relative to the pre-defined occupied temperature set-point.

7. The thermostat of claim 1, wherein default values are provided by a manufacturer of the thermostat for the unoccupied temperature set-point, the occupied temperature set-point, and the sleep temperature set-point.

8. The thermostat of claim 1, wherein the pre-defined unoccupied temperature set-point, pre-defined occupied temperature set-point, and pre-defined sleep temperature set-point are adjustable by the user of the thermostat.

9. A thermostat for a heating and/or air conditioning system, comprising:
   an electronic memory in which three occupancy state temperature set-points are stored and predefined, the predefined occupancy state temperature set-points assigned to three occupancy states including an unoccupied state, an occupied-awake state, and an occupied-asleep state, where the predefined occupancy state temperature set-points are user-predefined for the occupancy states independently of any time period scheduled or schedulable for thermostat operation; and
   a microprocessor in communication with the electronic memory, being configured to control operation of a heating and/or air conditioning system to maintain a temperature set-point for a space, the microprocessor configured to execute instructions to:
   in response to user input, assign to each of a plurality of time periods during a day, one of the unoccupied state, the occupied-awake state and the occupied-asleep state;
   the microprocessor further configured to control operation of the heating and/or air conditioning system during a given time period to maintain the pre-defined occupancy state temperature set-point that corresponds to the occupancy state assigned to the given time period;
   wherein one of the occupancy states is selectable by a user for two or more of the time periods during the day.

10. The thermostat of claim 9, wherein the time periods during the day are adjustable.

11. The thermostat of claim 9, wherein the occupancy states are selectable for each day of the week.

12. The thermostat of claim 9, wherein the pre-defined unoccupied temperature set-point and pre-defined sleep temperature set-point are both off-set at least 3 degrees relative to the pre-defined occupied temperature set-point.

13. The thermostat of claim 9, wherein the pre-defined unoccupied temperature set-point, the pre-defined occupied temperature set-point, and the pre-defined sleep temperature set-point replace default values stored in the memory of the thermostat.

14. The thermostat of claim 9, wherein the pre-defined unoccupied temperature set-point, pre-defined occupied temperature set-point, and pre-defined sleep temperature set-point are adjustable by the user of the thermostat.

15. The thermostat of claim 9, wherein the electronic memory includes stored occupancy settings specific to a cooling mode of operation, which include a pre-defined occupied temperature set-point of 79 degrees Fahrenheit or less that is associated with the occupied-awake state, a pre-defined unoccupied temperature set-point greater than 80 degrees Fahrenheit that is associated with the unoccupied state, and a pre-defined sleep temperature set-point greater than 80 degrees Fahrenheit that is associated with the occupied-asleep state.

16. The thermostat of claim 9, wherein the electronic memory includes stored occupancy settings specific to a heating mode of operation, which include a pre-defined occupied temperature set-point of 70 degrees Fahrenheit or more that is associated with the occupied-awake state, a pre-defined unoccupied temperature set-point of 69 degrees Fahrenheit or less that is associated with the unoccupied state, and a pre-defined sleep temperature set-point of 69 degrees Fahrenheit or less that is associated with the occupied-asleep state.

17. A method of controlling a climate control system, the method comprising:
- displaying, on a display for user selection therefrom independent of any time period scheduled or schedulable for thermostat operation, three occupancy states including an unoccupied state, an occupied-awake state, and an occupied-asleep state;
- receiving at least one user input predefining at least one temperature set-point for assignment to a user-selected one of the three displayed occupancy states;
- storing one or more user-predefined temperature set-points including one or more of the following: a pre-defined unoccupied temperature set-point associated with the unoccupied state, a pre-defined occupied temperature set-point associated with the occupied-awake state and a pre-defined sleep temperature set-point associated with the occupied-asleep state;
- receiving a user selection of one of a plurality of time periods within a day, and a user selection of one of the three occupancy states for assignment to the user-selected time period;
- establishing thermostat operation to maintain only the occupied temperature set-point during any time period assigned the occupied-awake state, and only the unoccupied temperature set-point during any time period assigned the unoccupied state, and only the sleep temperature set-point during any time period assigned the occupied-asleep state; and
- assigning, in accordance with user input, one of the occupancy states to more than one time period in a day.

* * * * *